US006573308B1

(12) United States Patent
Braun et al.

(10) Patent No.: US 6,573,308 B1
(45) Date of Patent: Jun. 3, 2003

(54) BIOLOGICALLY DEGRADABLE FOAMED MATERIAL PARTICLES

(75) Inventors: Frank Braun, Ludwigshafen (DE); Guiscard Glück, Mainz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/049,054
(22) PCT Filed: Aug. 1, 2000
(86) PCT No.: PCT/EP00/07441
§ 371 (c)(1),
(2), (4) Date: Feb. 7, 2002
(87) PCT Pub. No.: WO01/12706
PCT Pub. Date: Feb. 22, 2001

(30) Foreign Application Priority Data

Aug. 11, 1999 (DE) .......................................... 199 38 008

(51) Int. Cl.⁷ .................................................. C08J 9/00
(52) U.S. Cl. ............................. 521/81; 521/59; 521/79; 521/84.1

(58) Field of Search ............................... 521/79, 81, 59, 521/84.1

(56) References Cited

U.S. PATENT DOCUMENTS 6,018,004 A   1/2000   Warzelhan et al.

FOREIGN PATENT DOCUMENTS

| DE | 198 02 718 | 7/1999 |
| EP | 667 369 | 1/1995 |
| WO | 94 06866 | 3/1994 |
| WO | 96/07687 | 3/1996 |
| WO | 96/15173 | 5/1996 |
| WO | 97/44388 | 11/1997 |

*Primary Examiner*—Morton Foelak
(74) *Attorney, Agent, or Firm*—Oblon, Spivak, McClelland, Maier & Neustadt, P.C.

(57) ABSTRACT

In a process for preparing expandable polymer beads based on a mixture made from
  A. a biodegradable aliphatic/aromatic copolyester and
  B. a biodegradable naturally occurring polymer,
    the mixture A+B is melted in an extruder, mixed with a volatile organic blowing agent, extruded and pelletized.

9 Claims, No Drawings

BIOLOGICALLY DEGRADABLE FOAMED MATERIAL PARTICLES

The invention relates to expandable polymer beads based on biodegradable polymers.

It is known that certain naturally occurring materials, e.g. cellulose and starch, are biodegradable, i.e. are decomposed by microorganisms, in particular during composting, to give low-molecular-weight substances. Some synthetic polymers, too, such as polyesters, are biodegradable. Although purely aliphatic polyesters have good biodegradablility, their low level of mechanical and thermal properties gives them poor suitability for practical applications. In contrast, aromatic polyesters have good mechanical properties but are not biodegradable.

WO 96/07687 discloses that copolyesters which comprise firstly aliphatic diols and secondly both aliphatic and aromatic dicarboxylic acids as monomer units have good mechanical and thermal properties and are at the same time biodegradable. This publication also mentions foamed moldings but nothing is said concerning their production.

WO 96/15173 likewise describes biodegradable copolyesters made from aliphatic diols and from a mixture of adipic acid and terephthalic acid, and modified by incorporating other esterification components. These polyesters can be used to make foams, by mixing a polymer melt with blowing agents and foam-extruding the mixture.

A disadvantage of the foam-extrusion process is that it can produce only foam moldings of simple shape, e.g. sheets or profiles. It is known that foam moldings of any desired shape can be produced by foaming and sintering expandable or, respectively, expanded polymer particles, for example those based on polystyrene or, respectively, on polyolefins.

Aliphatic/aromatic copolyesters degrade relatively slowly during composting. The degradation process can be adjusted as desired by admixing naturally occurring polymers which degrade rapidly.

EP-A 667 369 describes moldable foams made from biodegradable mixtures of thermoplastic starch and a synthetic thermoplastic polymer, e.g. an aliphatic polyester. The polymer mixtures here are extruded together with from 2 to 20% of water as blowing agent and pelletized to give expandable beads, which are then foamed in an extruder. The water content has to be set very precisely for each particular case. If the content is too high there is a risk that the polyester will hydrolyze and that the starch will begin to dissolve. Complicated drying of the foam beads is then required.

Finally, WO 97/44388 again describes foams made from moisture-resistant biodegradable mixtures of naturally occurring polymers, e.g. starch, with hydroxy-functional polyesters. These biodegradable materials, too, were foamed by the foam-extrusion process, using water as blowing agent.

It is an object of the present invention to provide expandable beads made from mixtures of biodegradable naturally occurring polymers and biodegradable polyesters, where there are none of the disadvantages mentioned.

We have found that this object is achieved by melting a mixture made from

A. a biodegradable aliphatic/aromatic copolyester and

B. a biodegradable naturally occurring polymer in an extruder, mixing with a volatile organic blowing agent, extruding and pelletizing.

Polyesters suitable for the novel process are described in the publications cited: WO 96/07687, WO 96/15173 and WO 97/44388.

Particularly preferred aliphatic/aromatic polyesters include polyesters in which the essential components present are:

a) an acid component made from
   a1) from 30 to 70 mol % of at least one aliphatic or cycloaliphatic $C_2$–$C_{20}$ dicarboxylic acid or of ester-forming derivatives or mixtures of these
   a2) from 30 to 70 mol % of at least one aromatic dicarboxylic acid or of ester-forming derivatives of these, and b) a diol component made from at least one $C_2$–$C_{12}$ alkanediol or from a $C_5$–$C_{10}$ cycloalkanediol, and also, if desired, c) a component selected from the group consisting of
   c1) at least one compound having at least three groups capable of ester formation
   c2) at least one isocyanate and
   c3) at least one divinyl ether,
   or mixtures of the same.

The incorporation of component c) results in long-chain branching.

Possible aliphatic and, respectively, cycloaliphatic acids and the corresponding derivatives a1 are those mentioned above. Particular preference is given to adipic acid or sebacic acid, ester-forming derivatives of each of these or mixtures of the same.

Aromatic dicarboxylic acids a2 are generally those having from 8 to 12 carbon atoms, for example terephthalic acid, isophthalic acid, 2,6-naphthoic acid and 1,5-naphthoic acid, and also ester-forming derivatives of the same. The di-$C_1$–$C_6$-alkyl esters, and also the anhydrides, are particularly suitable here. The aromatic dicarboxylic acids or ester-forming derivatives of the same a2 may be used individually or as a mixture of two or more of the same. Particular preference is given to terephthalic acid or ester-forming derivatives of the same, for example dimethyl terephthalate.

The partly aromatic polyesters are characterized by a molar mass (Mn) of from 5000 to 100,000 g/mol, in particular from 10,000 to 40,000 g/mol, with a viscosity number of from 50 to 400, in particular from 100 to 300 ml/g (measured in o-dichlorobenene/phenol; weight ratio 50/50, at a concentration of 0.5% by weight of polymer and at 25° C.).

Naturally occurring polymers B are preferably starch or cellulose or else derivatives of the same, e.g. esters or ethers, or else poly(hydroxycarboxylic acids), such as polylactic acid or polyhydroxybutyric acid, or else poly (aminocarboxylic acids), such as polyaspartic acid or derivatives of the same.

The weight ratio A:B is from 9:1 to 1:9, preferably from 3:1 to 1:3 and in particular from 2:1 to 1:2.

The biodegradable polymers A+B may comprise additives, such as stabilizers, neutralizing agents, lubricants, release agents, antiblocking agents, nucleating agents, flame retardants, nonfluorescing dyes or fillers.

In the novel preparation process, the polymer mixture A+B is melted in an extruder, if desired together with the additives, preferably at from 70 to 220° C., and mixed with a volatile blowing agent. Preferred blowing agents are $C_3$–$C_8$-hydrocarbons, halogenated hydrocarbons and $C_1$–$C_3$-alcohols. Particular preference is given to butane, pentane, isobutane and ethanol. The amount of the blowing agent used is preferably from 1 to 20% by weight, based on A+B.

After discharge from the extruder, the melt extrudate may either be cooled in a water bath and then pelletized or may be pelletized by hot cutting immediately after being discharged, followed by cooling of the pellets.

The resultant expandable polymer beads generally have a diameter of from 0.2 to 5 mm. They may be expanded by conventional methods, e.g. using steam or hot air, to give foam beads.

The foam beads may be further foamed and sintered as usual in closed molds using steam or hot air to give foam moldings of any desired shape.

The foam beads themselves may be used as a soil conditioner in fields and gardens, in which case the degradation time can be adjusted as desired by way of the ratio A:B.

Foam moldings made from the biodegradable foam beads may be used as single-use tableware, packaging trays, dishes or cups. Once comminuted they can be composted and thus degraded.

We claim:

1. A process for preparing expandable polymer beads based on a mixture comprising
   A. a biodegradable saturated aliphatic/aromatic copolyester and
   B. a biodegradable naturally occurring polymer
      in a weight ratio A:B of from 9:1 to 1:9, which comprises melting the mixture made from A+B in an extruder, mixing the same with a volatile organic blowing agent, and extruding and pelletizing the same.

2. A process as claimed in claim 1, wherein the polyester A is a condensation product comprising
   a. an acid component comprising
      a1. from 30 to 70 mol % of an aliphatic or cycloaliphatic $C_2$–$C_{20}$ dicarboxylic acid or of ester-forming derivatives of these,
      a2. from 70 to 30 mol % of an aromatic dicarboxylic acid or of ester-forming derivatives of these,
   b. a diol component made from a $C_2$–$C_{12}$ alkanediol or from a $C_5$–$C_{10}$ cycloalkanediol, and also, if desired,
   c. other ester-forming components.

3. A process as claimed in claim 1, wherein the polymer B is starch or cellulose or derivatives of the same.

4. A process as claimed in claim 1, wherein the volatile organic blowing agent is a $C_3$–$C_8$ hydrocarbon or a $C_1$–$C_3$ alcohol.

5. A process as claimed in claim 1, wherein the amount of the blowing agent used is from 1 to 20% by weight, based on A+B.

6. A process as claimed in claim 1, wherein the melt extrudate discharged from the extruder is cooled in a water bath and the solidified extrudate is pelletized.

7. A process as claimed in claim 1, wherein the melt extrudate discharged from the extruder is pelletized immediately after being discharged and the pellets are cooled.

8. A method of foaming a biodegradable polymer foam comprising foaming the expandable polymer beads as claimed in claim 1.

9. The process as claimed in claim 1, wherein the polymer B is an ester or an ether derivative of starch or cellulose.

* * * * *